United States Patent
Bowe

(10) Patent No.: US 7,148,270 B2
(45) Date of Patent: Dec. 12, 2006

(54) POLYMER-MODIFIED FIBER-CEMENT COMPOSITION

(75) Inventor: Michael Damian Bowe, Doylestown, PA (US)

(73) Assignee: Rohm and Haas Company, Philadelphia, PA (US)

( * ) Notice: Subject to any disclaimer, the term of this patent is extended or adjusted under 35 U.S.C. 154(b) by 438 days.

(21) Appl. No.: 10/438,479

(22) Filed: May 15, 2003

(65) Prior Publication Data

US 2004/0229978 A1 Nov. 18, 2004

(51) Int. Cl.
*C04B 24/26* (2006.01)

(52) U.S. Cl. .................. 524/4; 524/5; 524/7; 524/8

(58) Field of Classification Search ............. 524/4–5, 524/7–8
See application file for complete search history.

(56) References Cited

U.S. PATENT DOCUMENTS

| | | | |
|---|---|---|---|
| 3,509,020 A | 4/1970 | Gelsomino | 162/124 |
| 3,985,610 A | 10/1976 | Pomerhn et al. | 162/133 |
| 4,339,273 A | 7/1982 | Meier et al. | 106/90 |
| 4,880,467 A * | 11/1989 | Rirsch et al. | 524/8 |
| 5,443,627 A | 8/1995 | Von Au et al. | 106/2 |
| 5,571,618 A | 11/1996 | Hansen et al. | 428/359 |
| 5,696,185 A | 12/1997 | Beckerle et al. | 524/5 |

FOREIGN PATENT DOCUMENTS

| | | |
|---|---|---|
| EP | 0 931 889 B1 | 10/2002 |
| GB | 1 514 239 | 11/1975 |
| JP | 8-208307 * | 8/1996 |
| WO | WO 00/71336 A1 | 11/2000 |
| WO | WO 02/081399 A1 | 10/2002 |

OTHER PUBLICATIONS

Abstract of XP 002246061 for Japanese Patent No. 19950017622.

* cited by examiner

*Primary Examiner*—Peter Szekely
(74) *Attorney, Agent, or Firm*—Ronald Bakule

(57) ABSTRACT

A method for providing a polymer-modified fiber-cement composite by forming an aqueous composition including admixing an emulsion polymer having a glass transition temperature (Tg) of from −25° C. to 150° C., cement, cellulosic fibers, siliceous material, and water; forming a composite precursor by removal of at least some of the water; and curing/drying the composite precursor at a temperature at least 10° C. higher than the Tg of the polymer is provided. In an alternative embodiment the emulsion polymer is applied to the composite precursor. Polymer-modified fiber-cement composites formed by the method of the invention are also provided.

7 Claims, No Drawings

POLYMER-MODIFIED FIBER-CEMENT COMPOSITION

This invention relates to a method for providing a polymer-modified fiber-cement composite by forming an aqueous composition including admixing an emulsion polymer having a glass transition temperature (Tg) of from −25° C. to 150° C., cement, cellulosic fibers, siliceous material, and water; forming a composite precursor by removal of at least some of the water; and curing/drying the composite precursor at a temperature at least 10° C. higher than the Tg of the polymer. The invention also relates to a method for providing a polymer-modified fiber-cement composite by forming an aqueous composition comprising admixing cement, cellulosic fibers, siliceous material, and water; forming a composite precursor by removal of at least some of the water; contacting the composite precursor with an emulsion polymer having a glass transition temperature (Tg) of from −25° C. to 150° C.; and curing/drying the composite precursor at a temperature at least 10° C. higher than the Tg of the polymer.

The present invention serves to provide an improved process for forming a polymer-modified fiber-cement composite which exhibits improved performance in at least one of: resistance to water, freeze-thaw stability, chemical resistance, impact strength, abrasion resistance, flexural strength, tensile strength, % strain at failure, dimensional stability, interlaminar bond strength, and fiber to matrix bond strength relative to a corresponding composite absent the polymer. Further, polymer modification may permit a composite with a reduced level of fibers, advantageous because fiber is typically more expensive than cement, to give performance equal to an unmodified composite. Polymer modification may also allow equal performance from a thinner and lighter fiber-cement board, which facilitates transportation, handling and installation.

PCT Patent Application WO 200071336 discloses a wood fiber-cement composite formed by pretreating the wood fibers with an aqueous chemical such as an acrylic emulsion or an alkylalkoxysilane before combining with cement.

The problem faced by the inventors is the provision of an improved process for forming a polymer-modified fiber-cement composite without the necessity for first forming a polymer modified fiber intermediate; particularly desired was a process suitable for effecting the curing/drying of the composite in an autoclave for enhanced productivity. The inventors found that a process including admixing all four ingredients directly, forming a composite precursor therefrom, and including the step of curing/drying the composite precursor at a temperature at least 10° C. higher than the Tg of the emulsion polymer beneficially provided useful composites. The inventors also found that a process including forming an aqueous composition comprising admixing cement, cellulosic fibers, siliceous material, and water; forming a composite precursor by removal of at least some of the water; contacting the composite precursor with an emulsion polymer having a glass transition temperature (Tg) of from −25° C. to 150° C.; and curing/drying the composite precursor at a temperature at least 10° C. higher than the Tg of the polymer beneficially provided useful composites.

In a first aspect of the present invention there is provided a method for providing a polymer-modified fiber-cement composite comprising: forming an aqueous composition comprising admixing an emulsion polymer having a glass transition temperature (Tg) of from −25° C. to 150° C., cement, cellulosic fibers, siliceous material, and water; forming a composite precursor by removal of at least some of said water; and curing/drying said composite precursor at a temperature at least 10° C. higher than the Tg of said polymer.

In a second aspect of the present invention there is provided a method for providing a polymer-modified fiber-cement composite comprising: forming an aqueous composition comprising admixing cement, cellulosic fibers, siliceous material, and water; forming a composite precursor by removal of at least some of said water; contacting said composite precursor with an emulsion polymer having a glass transition temperature (Tg) of from −25° C. to 150° C.; and curing/drying said composite precursor at a temperature at least 10° C. higher than the Tg of said polymer.

This invention relates to a method for providing a polymer-modified fiber-cement composite including forming an aqueous composition by admixing an emulsion polymer having a glass transition temperature (Tg) of from −25° C. to 150° C., cement, cellulosic fibers, siliceous material, and water. By "polymer-modified fiber-cement composite" herein is mean a cured/dried composition which contains at least one polymer, at least one type of fibrous material, siliceous material, and cement, without regard for their interaction, reaction or spatial disposition therein.

The aqueous composition includes an emulsion polymer which contains at least one copolymerized ethylenically unsaturated nonionic monomer. By "nonionic monomer" herein is meant a monomer which is electrically neutral in the pH range of 1–14. The ethylenically unsaturated nonionic monomers include, for example, (meth)acrylic ester monomers including methyl (meth)acrylate, ethyl(meth)acrylate, butyl (meth)acrylate, isodecyl (meth)acrylate, lauryl (meth)acrylate, hydroxyethyl (meth)acrylate, and hydroxypropyl (meth)acrylate; (meth)acrylamide, (meth)acrylonitrile; styrene and substituted styrenes; butadiene; vinyl acetate, vinyl butyrate and other vinyl esters; and vinyl monomers such as vinyl chloride, vinylidene chloride. Preferred are all-acrylic and styrene/acrylic polymers. Preferred is a predominantly acrylic aqueous emulsion polymer. By "predominantly acrylic" herein is meant that the polymer contains greater than 50%, by weight, copolymerized units deriving from (meth)acrylic monomers such as, for example, (meth)acrylate esters, (meth)acrylamides, (meth)acrylonitrile, and (meth)acrylic acid. The use of the term "(meth)" followed by another term such as, for example, acrylate or acrylamide, as used throughout the disclosure, refers to both acrylates or acrylamides and methacrylates and methacrylamides, respectively.

The emulsion polymer may also contain from 0% to 5%, by weight based on total monomer weight, of a copolymerized monoethylenically-unsaturated acid monomer, based on the weight of the polymer, such as, for example, acrylic acid, methacrylic acid, crotonic acid, itaconic acid, fumaric acid, maleic acid, monomethyl itaconate, monomethyl fumarate, monobutyl fumarate, maleic anhydride, 2-acrylamido-2-methylpropane sulfonic acid, vinyl sulfonic acid, styrene sulfonic acid, 1-allyloxy-2-hydroxypropane sulfonic acid, alkyl allyl sulfosuccinic acid, sulfoethyl (meth)acrylate, phosphoalkyl (meth)acrylates such as phosphoethyl (meth)acrylate, phosphopropyl (meth)acrylate, and phosphobutyl (meth)acrylate, phosphoalkyl crotonates, phosphoalkyl maleates, phosphoalkyl fumarates, phosphodialkyl (meth)acrylates, phosphodialkyl crotonates, and allyl phosphate.

The emulsion polymer used in this invention may contain from 0% to 1%, by weight based on monomer weight, copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene.

Also, the emulsion polymer composition may be selected to react during the curing/drying step, such as crosslinking due to $Ca^{++}$ or $Ca(OH)_2$ or such reaction as may be effected by the heat of cure, or by grafting to other components in the composition.

The glass transition temperature ("Tg" herein) of the emulsion polymer is from −25° C. to 150° C., optionally from 50° C. to 125° C.; the monomers and amounts of the monomers selected to achieve the desired polymer Tg range are well known in the art. "Tg"s used herein are those calculated by using the Fox equation (T. G. Fox, Bull. Am. Physics Soc., Volume 1, Issue No. 3, page 123(1956)). that is, for calculating the Tg of a copolymer of monomers M1 and M2, $$1/Tg(\text{calc.}) = w(M1)/Tg(M1) + w(M2)/Tg(M2),$$

wherein

Tg(calc.) is the glass transition temperature calculated for the copolymer w(M1) is the weight fraction of monomer M1 in the copolymer w(M2) is the weight fraction of monomer M2 in the copolymer Tg(M1) is the glass transition temperature of the homopolymer of M1

Tg(M2) is the glass transition temperature of the homopolymer of M2, all temperatures being in ° K.

The glass transition temperatures of homopolymers may be found, for example, in "Polymer Handbook", edited by J. Brandrup and E. H. Immergut, Interscience Publishers. It is recognized in the art that the use of permanent or fugitive plasticizers described, for example as plasticizers, coalescents, and film-forming aids, modify the effective Tg of the polymer. In the event that such materials are included in the aqueous composition of this invention, the Tg of the emulsion polymer for the purposes of this invention shall be the effective Tg of the polymer as may be determined by measuring the minimum film formation temperature of the aqueous composition absent the cement, siliceous material, and cement with and without the added permanent or fugitive plasticizer(s) and then correcting the calculated Fox Tg to that extent.

The polymerization techniques used to prepare aqueous emulsion polymers are well known in the art. In the emulsion polymerization process conventional surfactants may be used such as, for example, anionic and/or nonionic emulsifiers such as, for example, alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. Nonionic emulsifiers are preferred when stability in admixture with cement is desired although anionic or mixed anionic/nonionic surfactants may be used in the polymerization, optionally with post-added nonionic surfactant. The amount of surfactant used is usually 0.1% to 6% by weight, based on the weight of monomer. Either thermal or redox initiation processes may be used. The reaction temperature is maintained at a temperature lower than 120° C. throughout the course of the reaction. Preferred is a reaction temperature between 30° C. and 95° C., more preferably between 50° C. and 90° C. The monomer mixture may be added neat or as an emulsion in water. The monomer mixture may be added in one or more additions or continuously, linearly or not, over the reaction period ,or combinations thereof.

Free radical initiators (oxidants) which may be used at a level of 0.01–1.0%, by weight based on the total weight of the monomer, include, for example, hydrogen peroxide, sodium peroxide, potassium peroxide, t-butyl hydroperoxide, cumene hydroperoxide, ammonium and/or alkali metal persulfates, sodium perborate, perphosphoric acid and salts thereof, potassium permanganate, and ammonium or alkali metal salts of peroxydisulfuric acid, and t-alkyl hydroperoxide, t-alkyl peroxide, or t-alkyl perester wherein the t-alkyl group includes at least 5 Carbon atoms. Redox systems using the same initiator(s) coupled with a suitable reductant such as, for example, sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, sodium 2-hydroxy-2-sulfinatoacetic acid, acetone bisulfite, amines such as ethanolamine, glycolic acid, glyoxylic acid hydrate, lactic acid, glyceric acid, malic acid, tartaric acid and salts of the preceding acids may be used. Redox reaction catalyzing metal salts of iron, copper, manganese, silver, platinum, vanadium, nickel, chromium, palladium, or cobalt may be used. The oxidant(s), and optional reductant(s) may be added, for example, together or separately, in one or more shots or gradually, whether uniformly or not, or in combinations thereof or variations thereon as is desired; they may be added neat, in solution, or emulsified in an appropriate medium.

Chain transfer agents such as, for example, halogen compounds such as tetrabromomethane; allyl compounds; or mercaptans such as alkyl thioglycolates, alkyl mercaptoalkanoates, and $C_4$–$C_{22}$ linear or branched alkyl mercaptans may be used to lower the molecular weight of the formed polymer and/or to provide a different molecular weight distribution than would otherwise have been obtained with any free-radical-generating initiator(s). Linear or branched $C_4$–$C_{22}$ alkyl mercaptans such as n-dodecyl mercaptan and t-dodecyl mercaptan are preferred. Chain transfer agent(s) may be added in one or more additions or continuously, linearly or not, over most or all of the entire reaction period or during limited portion(s) of the reaction period such as, for example, in the kettle charge and in the reduction of residual monomer stage.

The emulsion polymer is also contemplated to be formed in two or more stages, the stages differing, for example, in composition and/or molecular weight.

The average particle diameter of the emulsion-polymerized polymer particles is preferred to be from 30 nanometers to 500 nanometers, as measured by a BI-90 Particle Sizer. Also contemplated are multimodal emulsion polymers in which at least two different particle sizes are included.

The emulsion polymer is present in the polymer-modified fiber-cement composite at a level of 0.1 to 15 wt %, preferably 1 to 10 wt %, based on the dry weights of the polymer and of the composite.

In one embodiment a cement-unstable emulsion polymer may be used. A latex is considered "cement stable" if upon mixing with cement it does not flocculate nor cause a shortening of the pot life or workability time of a mortar.

A stable latex of typical particle size 50 to 500 nanometers might pass through the screens of a fiber-cement forming machine, felts and wet fiber cement matrix as it is forming, such that much of the polymer is carried away in the excess process water. In such a case the polymer solids level in the final sheet would be lower than intended.

A cement unstable latex may be caused to predictably flocculate in a fiber cement wet mix at any point in the material stream leading up to the forming machine. These flocs can be in the form of clusters of primary particles, for example, from 100 up to 10,000 nanometers in size. Or, the flocculated polymer can precipitate onto any of the other solid components in the mix. In any of these cases, the flocculated polymer will be more completely retained in the solid mix after the excess process water is removed.

Known principles of emulsion polymer science can be used to control the size and distribution of flocculated clusters. These include: distribution of total process water among the various addition points; order of material addition; inclusion of additives with the emulsion polymer to speed or slow flocculation; rate of mixing; as well as the nature of the polymer latex chosen as the modifier.

"Cement" herein as used in forming the aqueous composition includes hydraulic substances which set and harden in the presence of water such as Portland cement, silicate-based cements, aluminate-based cements, pozzolanic cements and composite cements. The cement is typically present in the amount of 20–60 wt %, preferably 30–50 wt %, based on the dry weight of the composite.

"Cellulosic fibers" herein as used in forming the aqueous composition include natural fibers such as wood fibers including groundwood pulp, hardwood pulp, softwood pulp, Kraft pulp, whether bleached or unbleached, including recycled wood-based fibers and non-wood cellulosic fibers and modified fibers such as viscose and rayon. The pulp may be beneficially substantially separated into individual fibers by conventional techniques before or during the formation of the aqueous composition by techniques known in the paper industry such as by the use of a mechanical beater. The cellulosic fibers a preferably refined to a degree of between 250 to 500 CSF units (Canadian Standard Freeness). The individual fibers typically are 0.1 to 30 mm in length. The cellulosic fibers are typically present in the amount of 5–25 wt %, preferably 10–20 wt %, based on the dry weight of the composite.

"Siliceous material" herein as used in forming the aqueous composition include sand, ground sand, silica, and fine quartz. The siliceous material is typically present in the amount of 25–65 wt %, preferably 35–55 wt %, based on the dry weight of the composite.

The aqueous composition may include other ingredients as desired such as, for example, natural or synthetic fibers other than cellulosic fibers such as, for example, mineral wool, polyester fibers, polyvinyl alcohol fibers, and polyolefin fibers; fillers, pigments, fly ash, ceramic microspheres, aggregate, antifoaming agents, emulsifiers, crosslinkers, coalescing agents, neutralizers, thickeners or rheology modifiers, humectants, retarders, wetting agents, biocides, plasticizers, colorants, waxes, and anti-oxidants.

The aqueous composition is prepared by techniques which are well known in the fiber-cement art. The ingredients are mixed together as is convenient for efficient dispersion without pretreating or equilibrating any of the ingredients with each other.

The solids content of the aqueous coating composition may be from about 2% to about 85% by weight. For use with machinery typically used in forming fiber-cement substrates such by the Hatschek process and modifications thereof, a solids level of 2–10% by weight is preferred.

In the method of this invention at least some of the water of the aqueous composition, the water having been provided at least by being the carrier medium of the emulsion polymer and by added water, is removed to provide a composite precursor. Typically, most of the water is removed by mechanical means, such as by filtration through a screen, optionally with the assistance of vacuum boxes.

Then the composite precursor is cured/dried at a temperature which is at least 10° C. higher than the Tg of the polymer. By "curing/drying" or "cured/dried" herein is meant that the composite precursor is permitted to lose extra water or other volatile ingredients and to develop properties by physical or chemical processes, such as, for example, cement curing by hydration and, optionally, by ionic or covalent crosslinking. The curing/drying may be accelerated by heating, with or without humidity control, or autoclaving processes such as holding in a steam atmosphere, for example, at a temperature of 120° C. to 200° C. for a time such as, for example from 15 minutes to 12 hours. It is envisioned that the curing/drying may also continue to some extent after such a heating or autoclaving process.

In the second aspect of the present invention there is provided a method for providing a polymer-modified fiber-cement composite by forming an aqueous composition including admixing cement, cellulosic fibers, siliceous material, and water; forming a composite precursor by removal of at least some of the water; contacting the composite precursor with an emulsion polymer having a glass transition temperature (Tg) of from −25° C. to 150° C.; and curing/drying the composite precursor at a temperature at least 10° C. higher than the Tg of the polymer. In this embodiment all terms and description are as presented hereinabove with the exception that the emulsion polymer is applied to a composite precursor rather than provided in the aqueous composition from which the composite precursor is formed. In a Hatschek type process, for example, the emulsion polymer may be applied to the composite precursor on the wire, between some or all of the individual plies from which the composite precursor may be built up or on the final composite precursor surface, or combinations thereof Also envisioned are processes wherein the methods of both aspect of the invention are practiced, that is, the same or different emulsion polymer is utilized both in the aqueous composition and applied to the composite precursor.

The polymer-modifed fiber-cement composite of this invention may be used in various architectural applications such as, for example, roofing, siding, liner board, and backing board.

The following examples are presented to illustrate the invention and the results obtained by the test procedures.

EXAMPLE 1

Formation of Polymer-modified Fiber-cement

An admixture of 200 parts sand/100 parts cement/30 parts cellulosic fibers/10 parts emulsion polymer (solids basis)/44 parts water is made, is formed into flex bars [5 inches(12.7 cm)×0.75 inch(1.91 cm)×0.5 inch(1.27 cm)], is cured 1 week at 25° C./55% relative humidity("RT"), an is subsequently cured in an autoclave (170° C./7 hours). Nonionic emulsion polymer 1 has a Tg (Fox)=5° C.;Anionic emulsion polymer 2 which is formulated with 4% TRITON™ X-405 (solids on polymer solids) to give it adequate cement stability has a Tg (Fox)=87° C. An amount of defoamer effective to provide the same density as for the polymer-free sample is used with polymers 1 and 2. Flexural strength ("flex") is measured:

| Polymer | Flex after 25° C. cure | Flex after 170° C. cure |
| --- | --- | --- |
| none | 1280 psi | 1530 psi |
| 1 | 1420 | 2890 |
| 2 | 850 | 2800 |

The flexural strength of the polymer-modified fiber-cement of this invention incorporating polymer 1 cured at either temperature (i.e., 20° C. or 165° C. above its Tg) is superior to that of the polymer-free comparative. The flexural strength of the polymer-modified fiber-cement of this invention incorporating polymer 2 cured at 170° C. (i.e., 83° C. above its Tg) is superior to that of the polymer-free comparative and is superior to the comparative example incorporating polymer 2 cured at 25° C. (i.e., 62° C. below its Tg).

EXAMPLE 2

Preparation of Polymer-modified Fiber-cement

A 5 wt % solids wet mix formulation for use on a forming machine (Hatschek) is prepared. Parts (except for water) are by dry weight; emulsion polymer is provided at 45 wt % solids. Additives as flocculants and defoamers in effective amounts may be added.

|  | Unmodified | 2% polymer | 5% polymer |
| --- | --- | --- | --- |
| Cement | 40 | 40 | 40 |
| Silica Flour | 45 | 45 | 45 |
| Cellulose fibers | 15 | 15 | 15 |
| Emulsion polymer | 0 | 2 | 5 |
| Water | 1900 | 1896 | 1889 |

EXAMPLE 2a

Cellulose fibers, water and emulsion polymer are combined. With mixing, silica and cement are added. This mixture is filtered through a forming screen, optionally with suction, to remove excess process water. The uncured composite precursor may be further pressed, then cured under ambient conditions, or elevated T and relative humidity, or in an autoclave.

EXAMPLE 2b

A solid (powder or granular) polymer which is not redispersible in water is incorporated into the Unmodified mix at from 1–10 wt % on total solids, and this is then processed and cured as in Example 2a.

EXAMPLE 2c

Polymer from a polymer emulsion or polymer solution or a polymer melt may be adsorbed onto the silica or optional fillers, then dried. These fillers are incorporated in the Unmodified mix as in Example 2a.

The cured fiber cement is tested for resistance to water, freeze-thaw, chemical resistance, impact and abrasion, as well as flexural and tensile strength, % strain at failure, dimensional stability and interlaminar bond and fiber-to-matrix bond. Polymer-modified composites are expected to have superior performance in at least one of these tests when the emulsion polymer has a glass transition temperature (Tg) of from −25° C. to 150° C. and curing/drying of the composite precursor takes place at a temperature at least 10° C. higher than the Tg of the polymer.

EXAMPLE 3

Formation of a Polymer-modified Fiber-cement Composite with Controlled Flocculation of Emulsion Polymer A cement-unstable emulsion polymer (4.4 kg, 2.0 kg solids) is diluted in 200 kg water used to pulp 15 kg cellulose. This mixture, having 7.5 wt % fiber and 1.0 wt % polymer in water, is carried through the usual process. Additional process water, 1000 kg, is added and the dilute mix moved to the mixer. Silica flour, 45 kg, is added, then 40 kg of cement. At the time of cement addition or shortly thereafter, the emulsion polymer flocculates and at least some some clusters deposit onto the other solid components. The remainder of the process water (696 kg) is added, giving 2000 kg of a 5 wt % solids wet mix with 2 wt % polymer on solids, and a reduced level of primary polymer particles. This wet mix may be formed on any fiber cement machine. At least part of the water removed on machine to form a composite precursor which is then cured/dried.

The cured fiber cement is tested for resistance to water, freeze-thaw, chemical resistance, impact and abrasion, as well as flexural and tensile strength, % strain at failure, dimensional stability and interlaminar bond and fiber-to-matrix bond. Polymer-modified specimens are expected to have superior performance in at least one of these tests when the emulsion polymer has a glass transition temperature (Tg) of from −25° C. to 150° C. and curing/drying of the composite precursor takes place at a temperature at least 10° C. higher than the Tg of the polymer.

EXAMPLE 4

Formation of a Polymer-modified Fiber-cement Composite by Adding Polymer on the Forming (Hatschek Process) Machine EXAMPLE 4a As a formed composite precursor ply is transferred across the top of a Hatschek machine, an emulsion polymer is applied by spraying or other known means. Based on the weight/$m^2$ of fresh sheet, latex is applied at a rate to give the desired level of modification, in the range of 0.1–15% polymer solids on total solids.

There are several methods to control whether a polymer penetrates deeply into a ply, or remains more concentrated near the boundary of successive plies.

i) Application before the vacuum dewatering boxes will draw the emulsion polymer more deeply into a ply. Application at the forming roll will limit polymer penetration to how far it can diffuse.
  ii) Machine parameters such as higher vacuum strength or slower running speed, can be used to allow greater penetration of polymer into a ply.
  iii) A cement unstable emulsion polymer, or higher viscosity emulsion polymer will penetrate less than a stable or low viscosity latex. It will be noted that this method allows use of an emulsion polymer which is considered an unsuitable cement modifier in traditional cementitious mixes.

EXAMPLE 4b

Polymer may not be desired uniformly through the entire thickness of a sheet, and application on the machine can accomplish this. For example, the first ply against the forming drum is the surface that will ultimately be exposed when the finished fiber cement sheet is installed. To avoid a polymeric appearance (e.g. glossiness), the polymer is eliminated from this ply by switching off the latex sprayer during the first turn of the forming drum. Or, polymer may only be desired in the bottom half of a sheet's thickness [as taught in U.S. Pat. No. 6,311,448], so a latex sprayer is switched on only for the last 4 turns of an 8 ply sheet.

EXAMPLE 4c

A Tg=70° C. emulsion polymer is applied to the ply on a forming roll. Provided that the plant temperature and machine surfaces remains sufficiently below 70° C., any spilled or oversprayed latex would not be tacky and thus will be easy to clean after drying. But the polymer incorporated in the sheet will effectively modify the composite when the sheet is cured in an autoclave at a temperature greater than 80° C.

In Examples 4a and 4b, the formed composite precursor is cured and dried. The cured fiber cement is tested for resistance to water, freeze-thaw, chemical resistance, impact and abrasion, as well as flexural and tensile strength, % strain at failure, dimensional stability and interlaminar bond and fiber-to-matrix bond. Polymer-modified specimens are expected to have superior performance in at least one of these tests when the emulsion polymer has a glass transition temperature (Tg) of from −25° C. to 150° C. and curing/drying of the composite precursor takes place at a temperature at least 10° C. higher than the Tg of the polymer.

What is claimed is:

1. A method for providing a polymer-modified fiber-cement composite comprising
   forming an aqueous composition comprising admixing a flocculated emulsion polymer having a glass transition temperature (Tg) of from −25° C. to 150° C., cement, cellulosic fibers, siliceous material, and water, and removing water by mechanical means followed by curing/drying at a temperature at least 10° C. higher than the Tg of said polymer.

2. The method of claim 1 wherein said composite comprises from 0.1% to 15% polymer by weight on a dry polymer and dry composite basis.

3. The method of claim 2 wherein said polymer has a glass transition temperature of from 50° C. to 150° C.

4. A method for providing a polymer-modified fiber-cement composite comprising
   forming an aqueous composition comprising admixing cement, cellulosic fibers, siliceous material, and water;
   removing water by mechanical means;
   applying an emulsion polymer having a glass transition temperature (Tg) of from −25° C. to 150° C. wherein the emulsion polymer flocculates upon contact with the ingredients of the admixture; and
   curing/drying at a temperature at least 10° C. higher than the Tg of said polymer.

5. The method of claim 4 wherein said composite comprises from 0.1% to 15% polymer by weight on a dry polymer and dry composite basis.

6. The method of claim 5 wherein said polymer has a glass transition temperature of from 50° C. to 150° C.

7. A polymer-modified fiber-cement composite formed by the method of claim 1 or claim 4.

* * * * *

UNITED STATES PATENT AND TRADEMARK OFFICE
CERTIFICATE OF CORRECTION

| | | |
|---|---|---|
| PATENT NO. | : 7,148,270 B2 | Page 1 of 1 |
| APPLICATION NO. | : 10/438479 | |
| DATED | : December 12, 2006 | |
| INVENTOR(S) | : Michael Damian Bowe | |

It is certified that error appears in the above-identified patent and that said Letters Patent is hereby corrected as shown below:

Column 5, Line 61. Please replace "aqueous coating composition" with -- -- aqueous composition -- --.

Column 8, Line 26. Please replace "At least part of the water removed on machine to form a composite precursor which is then cured/dried." with -- -- At least part of the water is removed on the machine to form a composite precursor which is then cured/dried. -- --

Column 9, Line 30. Please replace "In Examples 4a and 4b, the formed composite precursor is cured and dried." with -- -- In Examples 4a, 4b and 4c, the formed composite precursor is cured and dried. -- --

Signed and Sealed this

Twenty-seventh Day of March, 2007

JON W. DUDAS
*Director of the United States Patent and Trademark Office*